US006700736B1

(12) United States Patent
Wu et al.

(10) Patent No.: US 6,700,736 B1
(45) Date of Patent: Mar. 2, 2004

(54) AIRFLOW SPOILER BETWEEN CO-ROTATING DISKS

(75) Inventors: Hsueh-Chieh Wu, Menlo Park, CA (US); Lin Yang, San Jose, CA (US); Jin Hui Ou-Yang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 69 days.

(21) Appl. No.: 10/112,304

(22) Filed: Mar. 29, 2002

(51) Int. Cl.⁷ ............................................... G11B 33/14
(52) U.S. Cl. ................................................. 360/97.03
(58) Field of Search .......................... 360/97.01–97.04

(56) References Cited

U.S. PATENT DOCUMENTS

| | | | | |
|---|---|---|---|---|
| 5,134,530 A | * | 7/1992 | Hall ........................ | 360/97.03 |
| 5,898,545 A | * | 4/1999 | Schirle ..................... | 360/97.03 |
| 6,449,119 B1 | * | 9/2002 | Hashizume et al. ..... | 360/97.03 |
| 6,496,327 B2 | * | 12/2002 | Xia et al. ................ | 360/97.03 |
| 6,535,350 B1 | * | 3/2003 | Genheimer et al. ...... | 360/97.02 |
| 6,549,366 B1 | * | 4/2003 | Ichiyama ................. | 360/97.03 |
| 6,570,736 B2 | * | 5/2003 | Noda ....................... | 360/97.01 |

* cited by examiner

*Primary Examiner*—Allen Cao
(74) *Attorney, Agent, or Firm*—Milad G. Shara, Esq.; Knobbe Martens Olson & Bear LLP

(57) ABSTRACT

A disk drive includes a spindle motor assembly mounted on an enclosure and at least two disks. The disks are mounted on a hub of the spindle motor assembly. Each of the disks have a magnetic medium deposited between an inner circumference and an outer circumference. The disks define a volume therebetween wherein airflow is generated when the disks rotate. The disk drive also includes an airflow spoiler positioned between the disks. The airflow spoiler has a spoiler mounting portion and a non-data bearing extending portion. The spoiler mounting portion is configured to be mounted on the hub of the spindle motor assembly. The non-data bearing extending portion is connected to the spoiler mounting portion and extends outwardly therefrom into the volume defined between the disks. The non-data bearing extending portion extends at least partially over the magnetic medium.

34 Claims, 6 Drawing Sheets

US 6,700,736 B1

AIRFLOW SPOILER BETWEEN CO-ROTATING DISKS

BACKGROUND OF THE INVENTION

1. Field of the Invention

This application relates to a disk drive. More particularly, this application relates to an airflow spoiler that disrupts the formation of a laminar core airflow pattern between two co-rotating disks.

2. Description of the Related Art

A disk drive includes at least one disk with a magnetic medium deposited thereon between an inner circumference and an outer circumference. The disk is mounted on and rotated by a spindle motor assembly. The disk drive also includes a data transfer head that writes data onto the magnetic medium and that reads data from the magnetic medium in concentric, generally circular tracks. In most applications, the data transfer head is extended out over the magnetic medium by an actuator assembly that moves the head in an arcuate path with respect to the magnetic medium. The actuator assembly usually includes an actuator arm and a head-gimbal assembly (HGA) that includes the data transfer head. The tracks on the disk are divided into sectors, which are presented to the data transfer head by the rotation of the disk.

Generally, the data transfer head is positioned over a selected track by a servo-system that includes servo data written onto the tracks. The servo information can be read by the data transfer head to provide an indication of how close the head is to the centerline of a track. When the head is over the centerline of the track and follows it, the head is said to be track-following. When the head wanders from the centerline of the track, there is said to be track misregistration, or "TMR."

One factor that influences the TMR that the disk drive will experience is the airflow patterns that are generated by the rotation of the disk. As is known, a moving surface, such as the rotating disk, will cause a surrounding fluid, such as air, to move. The movement of this air near the surface of the disk can take different forms depending on the location of other structures near the rotating disk (e.g., another disk), the rotational speed of the disk, the proximity of a boundary (e.g., the outer edge of the disk), and other factors. In general, a laminar airflow pattern is induced under some conditions between two disks that are adjacent, i.e., co-rotating disks. This pattern generally extends to a location between the inner circumference of the disks and the outer circumference of the disks. Variability in the size and location of the laminar airflow pattern induces variable vibrations in the actuator arms. These variable vibrations propagate into the head-gimbal assembly and cause the data transfer head to move with respect to the track below the head, and thus increase the TMR experienced by the disk drive. Increased TMR is not desirable because increased TMR limits track-to-track spacing (i.e., track pitch) and consequently limits areal density.

SUMMARY OF THE INVENTION

An object of this invention is to provide an airflow spoiler that disrupts the laminar inner core to reduce the TMR experienced by a disk drive.

In one embodiment, the present invention comprises a disk drive that includes an enclosure, a spindle motor assembly mounted on the enclosure, and at least two disks. The spindle motor assembly includes a hub that is rotatable with respect to the enclosure. The at least two disks are mounted on the hub. Each of the disks has an inner circumference, an outer circumference, and a magnetic medium deposited between the inner circumference and the outer circumference. The disks define a volume therebetween wherein airflow is generated when the disks rotate. The disk drive also includes an actuator assembly and an airflow spoiler positioned between the at least two disks. The airflow spoiler has a spoiler mounting portion and a non-data bearing extending portion. The spoiler mounting portion is configured to be mounted on the hub of the spindle motor assembly. The non-data bearing extending portion is connected to the spoiler mounting portion and extends outwardly therefrom into the volume defined between the disks. The non-data bearing extending portion extends at least partially over the magnetic medium.

In another embodiment, the present invention comprises a disk drive that includes an enclosure and a spindle motor assembly mounted on the enclosure. The spindle motor assembly includes a hub that is rotatable with respect to the enclosure. The disk drive also includes an actuator assembly that has a first actuator arm with a first head-gimbal assembly mounted thereon and a second actuator arm with a second head-gimbal assembly mounted thereon. The disk drive also includes a first disk mounted on the hub and a second disk mounted on the hub. The first disk and the second disk define a volume therebetween wherein airflow is generated when the first disk and the second disk rotate. The disk drive also has an airflow spoiler positioned between the first disk and the second disk. The airflow spoiler comprises a spoiler mounting portion configured to be mounted on the hub of the spindle motor assembly and also comprises an extending portion. The extending portion extends outwardly from the spoiler mounting portion into the volume defined between the first disk and the second disk. The extending portion is positioned on the spoiler mounting portion so as to create a first clearance between the extending portion and the first disk and to create a second clearance between the extending portion and the second disk. The first clearance is large enough to receive a portion of the first head-gimbal assembly when the actuator assembly moves the portion of the first head-gimbal assembly into the first clearance. The second clearance is large enough to receive a portion of the second head-gimbal assembly when the actuator assembly moves the portion of second head-gimbal assembly into the second clearance.

In another embodiment, the present invention comprises an airflow spoiler for a disk drive. The disk drive has an enclosure, a spindle motor assembly mounted on the enclosure, and at least two disks. The spindle motor assembly includes a hub. The at least two disks are mounted on the hub. Each of the disks has an inner circumference, an outer circumference, and a magnetic medium deposited between the inner circumference and the outer circumference. The disks define a volume therebetween wherein airflow is generated when the disks rotate. The airflow spoiler includes a spoiler mounting portion and a non-data bearing extending portion. The spoiler mounting portion is configured to be mounted on the hub of the spindle motor assembly. The non-data bearing extending portion is connected to the spoiler mounting portion and extends outwardly therefrom into the volume defined between the disks. The non-data bearing extending portion is configured to extend at least partially over the magnetic medium when the airflow spoiler is positioned in the disk drive.

In another embodiment, the present invention comprises an airflow spoiler for a disk drive. The disk drive has an enclosure and a spindle motor assembly mounted on the enclosure. The spindle motor assembly includes a hub. The disk drive also includes a first disk mounted on the hub and a second disk mounted on the hub. The first disk and the second disk define a volume therebetween wherein airflow is generated when the first disk and the second disk rotate. The disk drive also includes an actuator assembly that has a first actuator arm and a second actuator arm. The first actuator arm has a first head-gimbal assembly mounted thereon, and the second actuator arm has a second head-gimbal assembly mounted thereon. The airflow spoiler includes a spoiler mounting portion and an extending portion. The spoiler mounting portion is configured to be mounted on the hub of the spindle motor assembly. The extending portion extends outwardly from the spoiler mounting portion into the volume defined between the first disk and the second disk. The extending portion is positioned on the spoiler mounting portion so that when the airflow spoiler is positioned in the disk drive, a first clearance is created between the extending portion and the first disk, and a second clearance is created between the extending portion and the second disk. The first clearance is large enough to receive a portion of the first head-gimbal assembly when the actuator assembly moves the portion of the first head-gimbal assembly into the first clearance. The second clearance is large enough to receive a portion of the second head-gimbal assembly when the actuator assembly moves the portion of the second head-gimbal assembly into the second clearance.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention.

DETAILED DESCRIPTION OF THE PREFERRED EMBODIMENT

Figure 1:
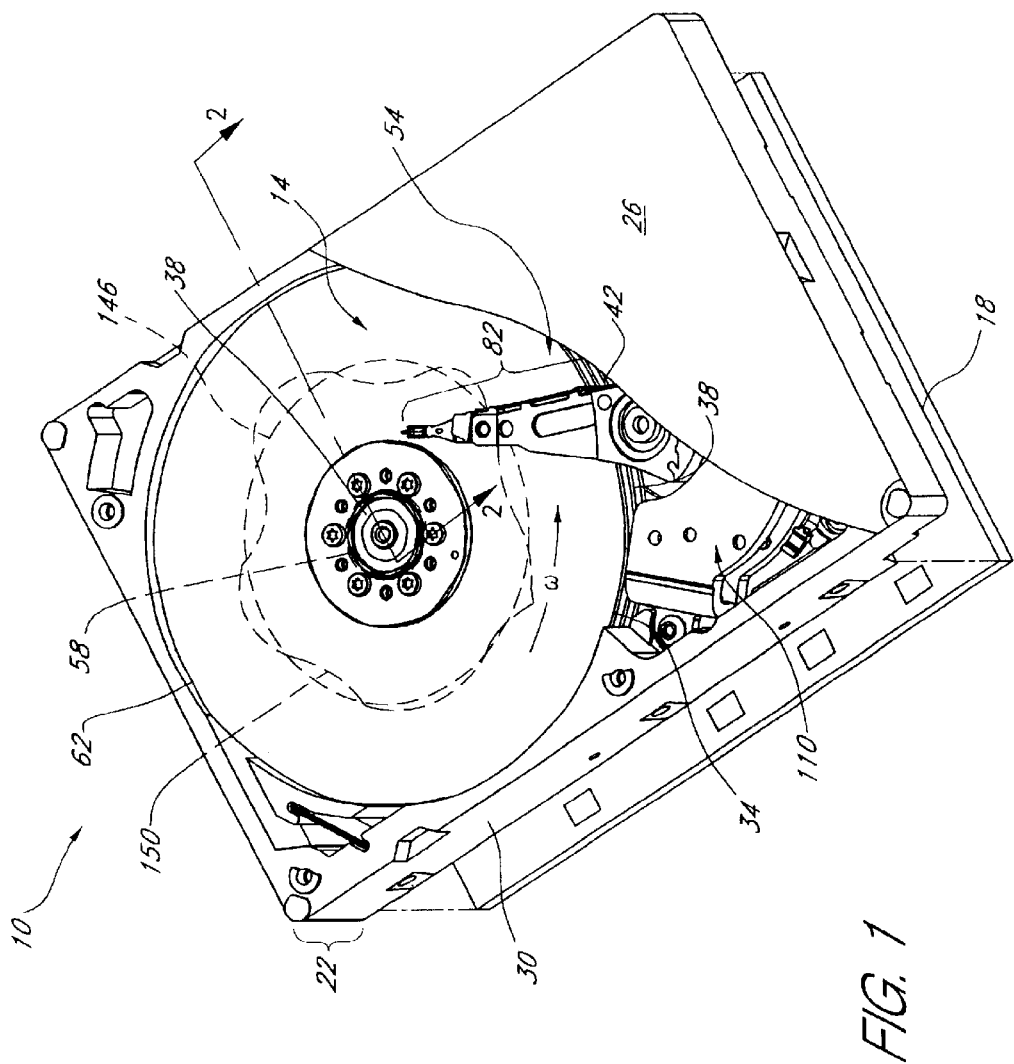
FIG. 1 is a perspective view of a disk drive with a printed circuit board removed and a cover partially broken away to illustrate internal components.
Figure 2:
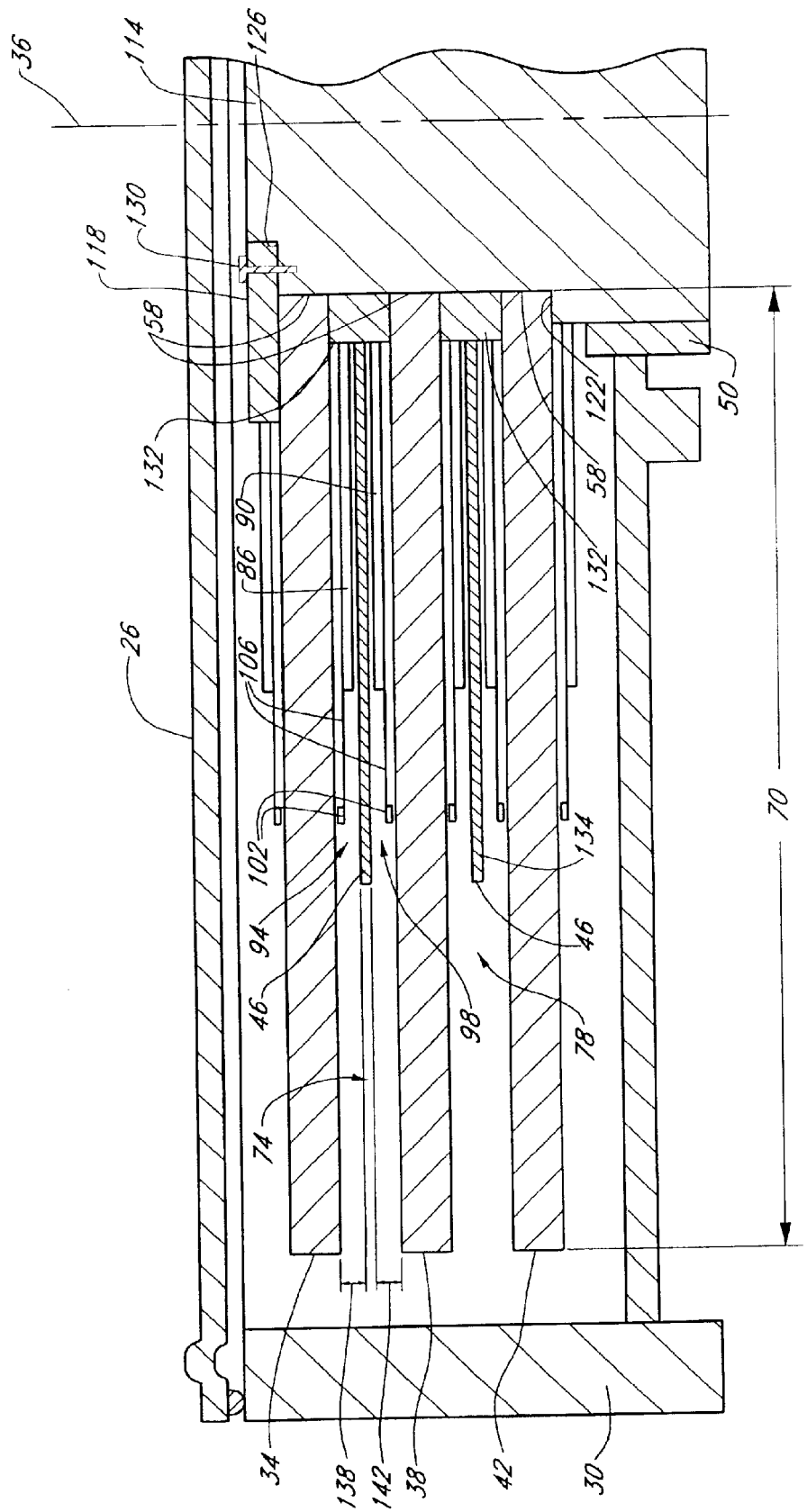
FIG. 2 is a cross-section view of the disk drive of FIG. 1 taken along section line 2—2.

FIG. 1 is a perspective view of a disk drive 10. The disk drive 10 includes a head-disk assembly (HDA) 14 and a printed circuit board 18. The HDA 14 comprises an enclosure 22 that includes a cover 26 and a base 30. The printed circuit board 18 is connectable to the base 30, but is shown removed therefrom in FIG. 1 for illustration. The HDA 14 also includes a first disk 34, a second disk 38, a third disk 42, airflow spoilers 46 (see FIG. 2), a spindle motor assembly 50, and a head-stack assembly (HSA) 54. Each of the first disk 34, the second disk 38, and the third disk 42 has a surface that faces toward the printed circuit board 18 and has a surface that faces away from the printed circuit board 18. Each of the disks 34, 38, and 42 has an inner circumference 58 of a selected diameter, an outer circumference 62, and at least one surface 66 that has a magnetic medium deposited thereon. Data is stored on the magnetic medium in a conventional manner. Each of the disks 34, 38, and 42 has a distance 70 that is defined between the inner circumference 58 and the outer circumference 62.

Each of the disks 34, 38, and 42 is mounted on the spindle motor assembly 50 and is rotatable within the enclosure 22 about an axis 36. The first disk 34 and the second disk 38 define a volume 74 therebetween (see FIG. 2) wherein airflow is generated when the disks 34, 38 rotate. Another volume 78 is defined between the second disk 38 and the third disk 42 wherein such airflow is also generated when the disks 38, 42 rotate. The airflow in the volume 74 and the airflow in the volume 78 are in the form of one or more airflow patterns that are discussed in more detail below. Each airflow spoiler 46 is mounted on the spindle motor assembly 50 and is rotatable therewith.

In one embodiment of the disk drive 10, the HSA 54 includes an actuator assembly 82 that includes a first actuator arm 86 and a second actuator arm 90. The first actuator arm 86 has a first head-gimbal assembly 94 mounted thereon. The second actuator arm 90 has a second head-gimbal assembly 98 mounted thereon. Each of the first head-gimbal assembly 94 and the second head-gimbal assembly 98 comprises a data transfer head 102 and a suspension assembly 106. One end of the suspension assembly 106 of the first head-gimbal assembly 94 is mounted on the first actuator arm 86. One end of the suspension assembly 106 of the second head-gimbal assembly 98 is mounted on the second actuator arm 90. The actuator assembly 82 positions the data transfer head 102 of the first head-gimbal assembly 94 proximate the surface 66 of the disk 34 that faces toward the printed circuit board 18. The actuator assembly 82 positions the data transfer head 102 of the second head-gimbal assembly 98 proximate the surface 66 of the disk 38 that faces away from the printed circuit board 18. Preferably the actuator assembly 82 includes an actuator arm and a head-gimbal assembly for each of the surfaces 66 of each of the disks 34, 38, 42 (see FIG. 2).

Each of the data transfer heads 102 includes, in one embodiment, a read element and a write element and thus operates in a read/write system. One skilled in the art will recognize that the invention defined herein could also be used to reduce TMR in a read-only application, i.e., in an application having a data transfer head with a read element only.

The actuator assembly 82 is positioned by a rotary actuator 110 that is positioned under the control of a conventional servo system.

The spindle motor assembly 50 includes a rotatable hub 114 and a clamp 118. In one embodiment, the rotatable hub 114 is tiered, or stepped, to facilitate the mounting of the disks 34, 38, 42 and the airflow spoilers 46 thereon. The tiered effect is provided by forming the hub 114 with a first shoulder 122 that is defined by reducing the diameter of the hub 114 from a first diameter to a second diameter that is about equal to the selected diameter of the inner circumference 58 of the disks 34, 38, 42. The first shoulder 122 is located proximate the bottom of the hub 114, i.e., proximate the base 30. The tiered effect is further provided by forming the hub 114 with a second shoulder 126 near the upper end of the hub 114. The second shoulder 126 is defined by reducing the diameter of the hub 114 from the second diameter to a smaller third diameter. The clamp 118 is configured to mate with the second shoulder 126 in a known manner, e.g., by a plurality of screws 130 or other mechanical fasteners that engage the top surface of the hub 114. As used herein, "bottom," "down," and "down-facing" are defined as closest to the bottom of the base 30, while "top," "up," and "up-facing" are defined as closest to the cover 26 regardless of the orientation of the disk drive 10.

Each airflow spoiler 46 has a spoiler mounting portion 130 and an extending portion 134. The spoiler mounting portion 130 is configured to be mounted on the hub 114 of the spindle motor assembly 50. Generally, "mounted on" means that during assembly, the spoiler mounting portion 132 can be slid over the hub 114 into place, but is coupled to the hub 114 when the clamp 118 is installed such that the hub 114 and the airflow spoiler 46 rotate together. In one embodiment, the airflow spoiler 46 is configured so that when it is mounted on the hub 114 between the first disk 34 and the second disk 38 (or between the second disk 38 and the third disk 42), the extending portion 134 is about half-way between the two co-rotating disks between which the airflow spoiler is mounted.

The extending portion 134 is connected to the spoiler mounting portion 132 and extends outwardly therefrom into the volume 74 defined between the disks 34, 38. Preferably, the extending portion 134 is not a data bearing component of the disk drive, i.e., the extending portion 134 is preferably a non-data bearing extending portion. In one embodiment, the extending portion 134 extends at least partially over the magnetic medium on the disks 34, 38. It should be recognized that a disk drive 10 can be oriented in various ways, and the extending portion 134 can extend over the disks 34, 38 without being physically above the disks 34, 38. In another embodiment, the extending portion 134 is positioned on the spoiler mounting portion 132 so as to create a first clearance 138 between the extending portion and the disk 34. A second clearance 142 is also created between the extending portion 134 and the disk 38 when the extending portion 134 is so positioned. The first clearance 138 is large enough to receive a portion of the first head-gimbal assembly 94 when the actuator assembly 82 moves the portion of the first head-gimbal assembly 94 into the first clearance 138. The second clearance 142 is large enough to receive a portion of the second head-gimbal assembly 98 when the actuator assembly 82 moves the portion of second head-gimbal assembly 98 into the second clearance 142. Additional embodiments of the airflow spoiler 46 are described below in connection with FIGS. 4 and 5.

The spindle motor assembly 50 is electrically connected to circuitry located on the printed circuit board 18, e.g., to a spindle motor controller. The spindle motor controller controls the rotation of the hub 114 of the spindle motor assembly 50 and the rotation of the disks 34, 38, 42 mounted thereon. When the disk drive 10 is operating, the disks 34, 38, 42 rotate at a substantially constant angular velocity ω. The direction of the rotation of the disks 34, 38, 42 is indicated by an arrow in FIG. 1. Of course, one skilled in the art will recognize that the invention described herein can be carried out in a disk drive having rotation opposite of that shown in FIG. 1.

As discussed above, the rotation of the disks 34, 38, 42 creates airflow within the enclosure 22. In particular, at least two types of airflow patterns build up between the disk 34 and the disk 38 (or between the disk 38 and the disk 42) in the disk drive 10 when the disks 34, 38, 42 rotate. For some disk drive configurations and at some speeds, a generally cylindrical laminar core airflow pattern 146 builds up between two co-rotating disks, e.g., between the first disk 34 and the second disk 38. The laminar core airflow pattern 146 is a ring of generally laminar airflow that extends from the inner circumference of the disks to a location between the inner circumference and the outer circumference. The motion of the disks 34, 38 causes this laminar core to rotate with the disks 34, 38.

At lower speeds, the outer surface of the laminar core, which defines an airflow boundary between the laminar airflow pattern and a more turbulent airflow pattern, is roughly cylindrical. Therefore, for a given position of the actuator arm, the location on the actuator arm where the outer surface of the laminar core airflow pattern strikes the actuator arm is generally constant.

At some conditions, a non-circular laminar airflow pattern 150 builds up between two co-rotating disks, e.g., the disk 34 and the disk 38. The non-circular laminar core 150 is an airflow pattern that occupies an irregular shaped volume that extends from a location proximate the inner circumference 58 of the disks 34, 38, 42 to a location between the inner circumference 58 and the outer circumference 62. For the irregular shaped laminar core, the location between the inner circumference 58 and the outer circumference 62 to which the laminar core extends comprises a variable radial length around the circumference of the pattern 150.

As the speed of the rotating disks 34, 38 increases, the outer surface of the laminar core becomes irregular in shape. Therefore, for a given position of the actuator arm 86, 90, the location where the outer surface of the laminar core strikes the actuator arm 86, 90 varies, i.e., the location moves along the actuator arms 86, 90. As the location of the outer surface of the laminar core moves along the actuator arm 86, 90, the proportion of the actuator arm 86, 90 that is in the laminar core and the proportion that is not in the laminar core varies. The present application is directed to controlling the airflow patterns between two co-rotating disks, e.g., in the volume 70, to reduce the variation.

Figure 3:
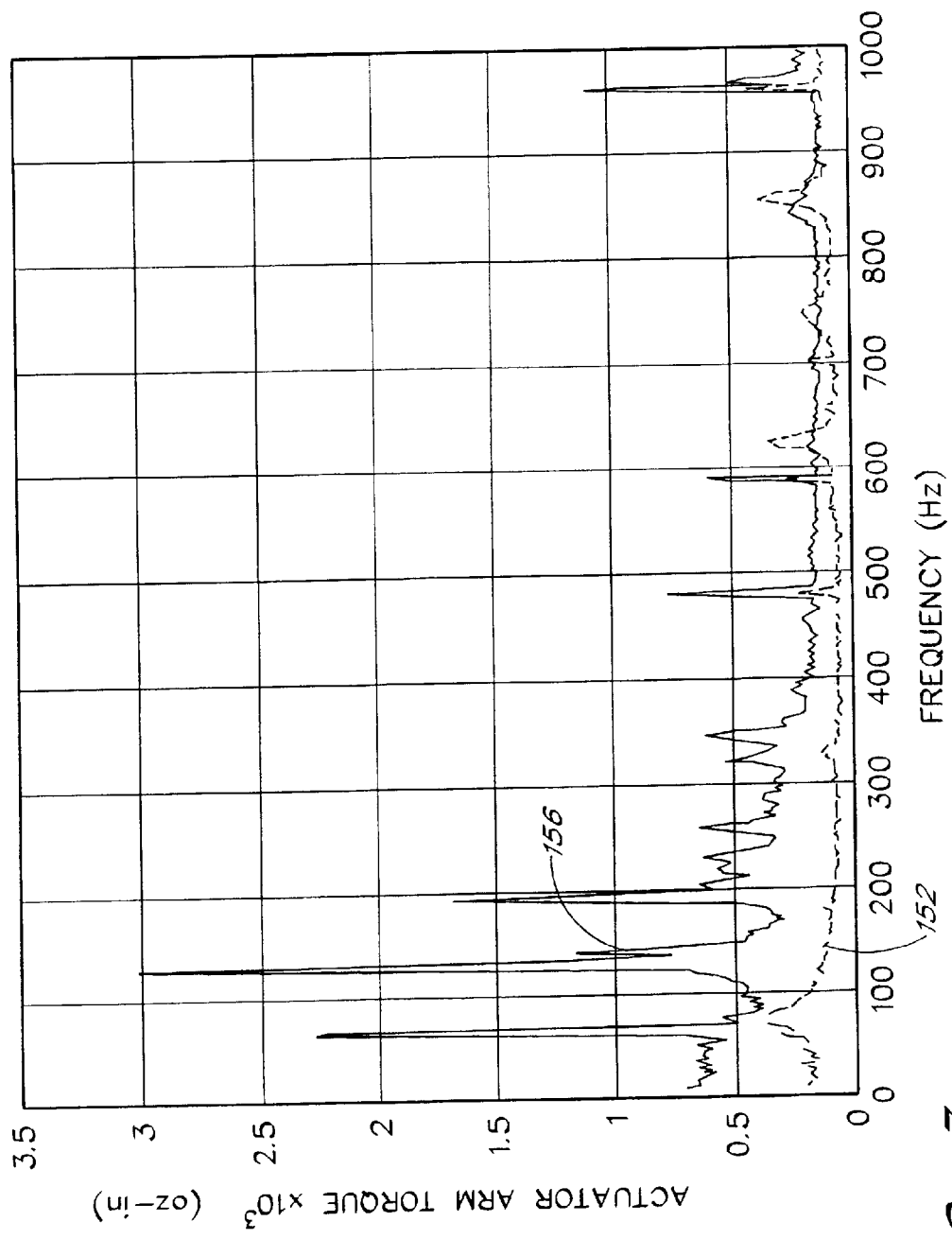
FIG. 3 is a graph showing actuator arm torque versus frequency that illustrates the effect of an irregular inner core airflow pattern.

FIG. 3 shows the effect of an irregular inner core on an actuator arm, such as the first actuator arm 86 or the second actuator arm 90. The y-axis in FIG. 3 represents the actuator arm torque, in ounce-inch, applied to the actuator arm. The x-axis represents frequency in hertz. A first plot 152 represents the torque associated with airflow for a single disk configuration. Because there is no second disk present, the laminar core effect does not manifest as it would with two co-rotating disks. As such, the single disk configuration is a baseline which exhibits relatively little actuator arm torque. A second line 156 illustrates the actuator arm torque associated with a multiple disk configuration. In this configuration, a relatively high actuator arm torque is applied to the actuator arm. This results in a higher applied torque under some conditions. This higher applied torque condition can unacceptably increase the TMR of the disk drive 10.

Figure 4:
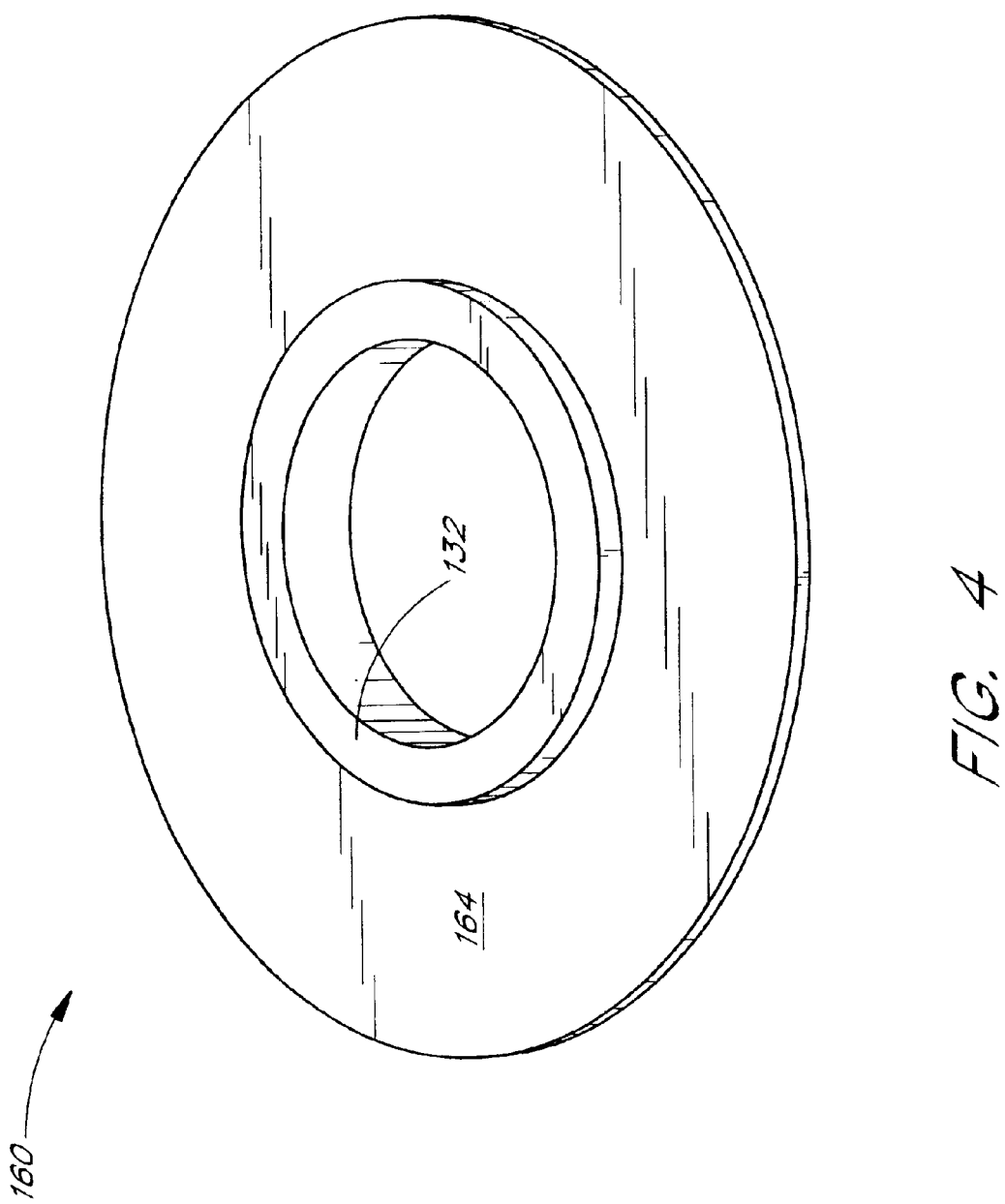
FIG. 4 is a perspective view of one embodiment of an airflow spoiler having a generally planar extending portion.

FIG. 4 shows one embodiment of an airflow spoiler 160 having the spoiler mounting portion 132 and a generally planar extending portion 164. The extending portion 164 is connected to the spoiler mounting portion 132 and extends outwardly therefrom. When the airflow spoiler 160 is mounted in the disk drive 10, the extending portion 164 extends into the volume 74 defined between the disks 34, 38. A corresponding extending portion 164 extends into the volume 78 defined between the disks 38, 42. The extending portion 164 of FIG. 4 is a generally planar structure that is mounted generally parallel to the disks. In the illustrated embodiment, the extending portion 164 is a ring mounted generally parallel to the disks. It should be recognized that the extending portion 164 could be non-circular, i.e., could have an outer perimeter having a non-constant radius.

The radial extent of the extending portion 164 can be measured as a percentage of the distance 70 defined between the inner circumference 58 and the outer circumference 62 of the disks 34, 38, 42. For example, in one embodiment, the extending portion 164 extends at least about forty percent of the distance 70 defined between the inner circumference 58 and the outer circumference 62. In another embodiment, the extending portion 164 extends at least about fifty percent of the distance 70. In another embodiment, the extending portion 164 extends at least about sixty percent of the distance 70. In a particularly preferred embodiment, the extending portion 164 extends about fifty-five percent of a distance 70. Of course, the above-recited extents of the extending portion 164 can be based on the average extent when the extending portion 164 is a planar structure with a non-constant outer radius.

Figure 5:
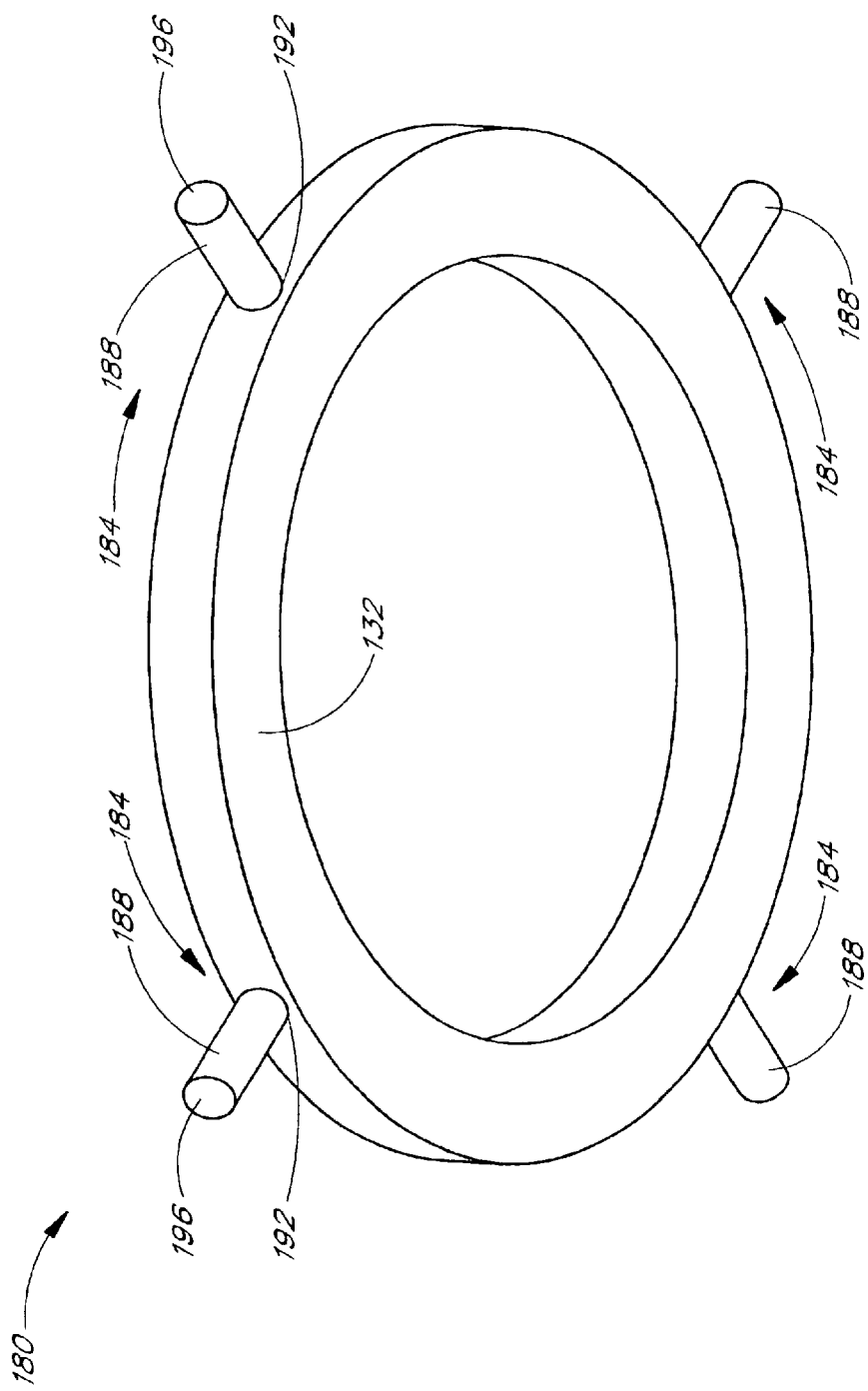
FIG. 5 is a perspective view of another embodiment of an airflow spoiler having a plurality of elongate members.

FIG. 5 shows an embodiment of an airflow spoiler 180 having the spoiler mounting portion 132 and an extending portion 184 that includes at least one elongate member 188 that extends outwardly from the spoiler mounting portion 132. In one embodiment, the elongate member 188 comprises a mounting end 192 and an outwardly extending end 196. The elongate member 188 is connected to the spoiler mounting portion 132 at the mounting end 192, while the extending end 196 terminates radially outwardly therefrom. In another embodiment, a generally planar structure, similar to the extending portion 164, is interposed between the spoiler mounting portion 132 and the elongate members 188. In one embodiment, the extending portion 184 includes four elongate members 188 that extend radially outwardly from the spoiler mounting portion 132. In some embodiments, the elongate members 188 are symmetrically positioned about the perimeter of the airflow spoiler 180. For example, if there are four elongate members 188, the elongate members 188 are each positioned ninety degrees from each other.

In one embodiment, at least one of the elongate members 188 has a generally oval transverse cross-section. In another embodiment, each of the elongate members 188 has a generally oval transverse cross-section. In another embodiment, at least one of the elongate members 188 has a generally triangular transverse cross-section.

In another embodiment, at least one of the elongate member 188 has a generally symmetrical airfoil-shaped transverse cross-section. As used herein, "generally airfoil-shaped" means that a portion of the elongate member 188 that first contacts the surrounding air when the airflow spoiler 180 rotates is rounded, while a portion of the elongate member 188 that follows is tapered. The generally airfoil shaped elongate member 188 could also be said to have a tear-drop shape.

In another embodiment, at least one of the elongate members 188 has a transverse perimeter that varies from one end of the elongate member to the other end thereof. Thus, the end of the elongate member 183 that has a varying transverse perimeter has a larger perimeter near the spoiler mounting end 192.

Figure 6:
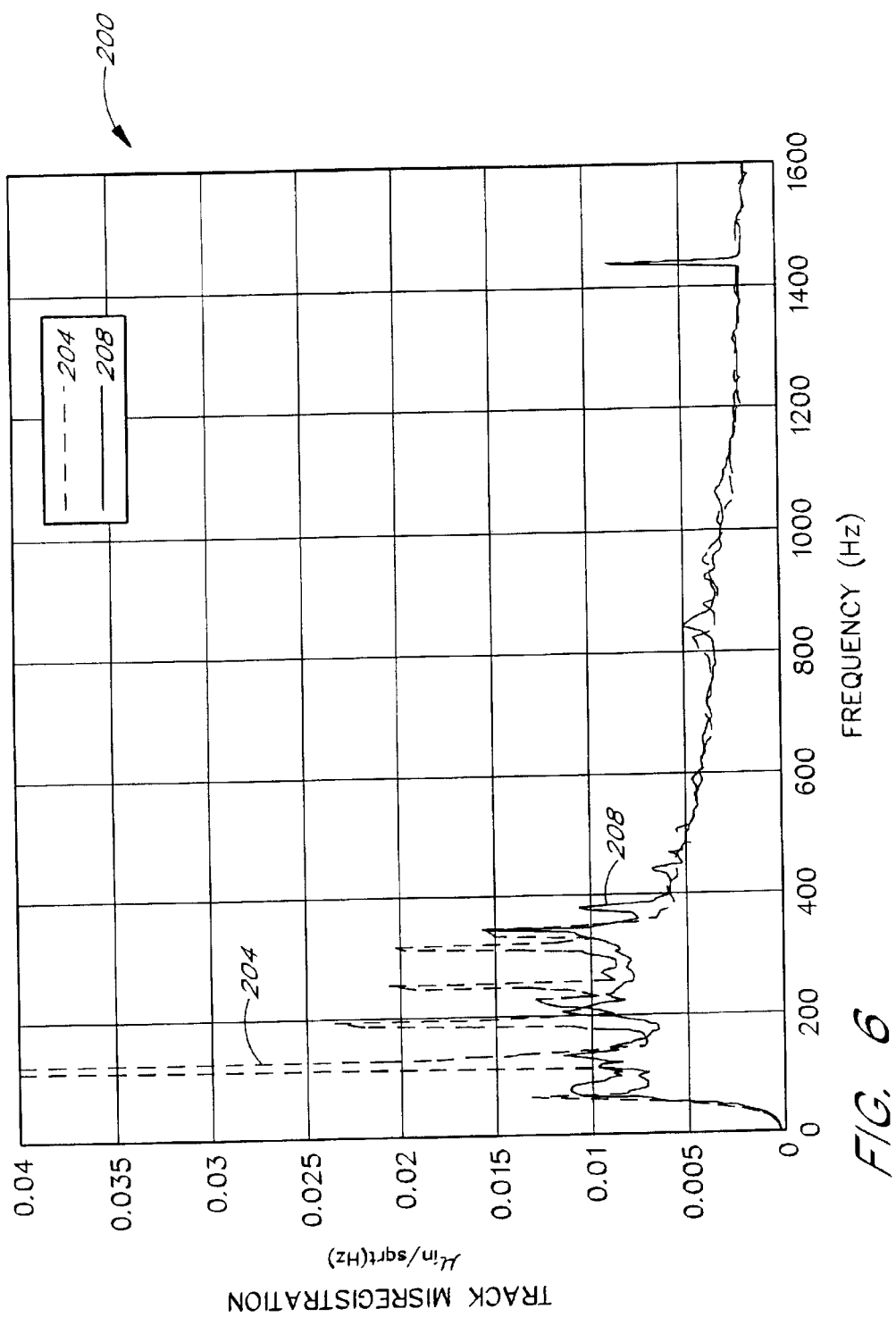
FIG. 6 is a graph showing a reduction in TMR achieved by using an airflow spoiler.

FIG. 6 is a chart 200 that illustrates the effect of the airflow spoiler 160 on the TMR of a disk drive 10. The y-axis of the chart 200 illustrates the TMR, as measured in microinches divided by the square-root of frequency. The x-axis of the chart 200 illustrates the frequency. A line 204 is a plot of TMR versus frequency for a disk drive without an airflow spoiler that has an irregular laminar inner core. A line 208 is a plot of TMR versus frequency for a disk drive having an airflow spoiler 160. As can be seen, the spoiler 160 tends to reduce the TMR of the disk drive 10. As discussed above, decreased TMR is desired to improve track-to-track spacing (i.e., track pitch) and consequently areal density.

What is claimed is:
1. A disk drive comprising:
   an enclosure;
   a spindle motor assembly mounted on the enclosure, the spindle motor assembly including a hub that is rotatable with respect to the enclosure;
   at least two disks mounted on the hub, each of the disks having an inner circumference, an outer circumference, and a magnetic medium deposited between the inner circumference and the outer circumference, the disks defining a volume therebetween wherein airflow is generated when the disks rotate;
   an actuator assembly; and
   an airflow spoiler positioned between the at least two disks, the airflow spoiler comprising:
      a spoiler mounting portion configured to be mounted on the hub of the spindle motor assembly; and
      a non-data bearing extending portion connected to the spoiler mounting portion and extending outwardly therefrom into the volume defined between the disks, the non-data bearing extending portion extending at least partially over the magnetic medium.

2. The disk drive of claim 1, wherein the non-data bearing extending portion comprises a generally planar structure mounted generally parallel to the disks.

3. The disk drive of claim 2, wherein the non-data bearing extending portion comprises a ring.

4. The disk drive of claim 3, wherein the non-data bearing extending portion extends at least about forty percent of a distance between the inner circumference of the disks and the outer circumference of the disks.

5. The disk drive of claim 3, wherein the non-data bearing extending portion extends at least about fifty percent of a distance between the inner circumference of the disks and the outer circumference of the disks.

6. The disk drive of claim 3, wherein the non-data bearing extending portion extends at least about sixty percent of a distance between the inner circumference of the disks and the outer circumference of the disks.

7. The disk drive of claim 3, wherein the non-data bearing extending portion extends about fifty-five percent of a distance between the inner circumference of the disks and the outer circumference of the disks.

8. The disk drive of claim 2, wherein the non-data bearing extending portion extends at least about forty percent of a distance between the inner circumference of the disks and the outer circumference of the disks.

9. The disk drive of claim 2, wherein the non-data bearing extending portion is mounted about one-half of a distance between the two disks.

10. A disk drive comprising:
   an enclosure;
   a spindle motor assembly mounted on the enclosure, the spindle motor assembly including a hub that is rotatable with respect to the enclosure;
   at least two disks mounted on the hub, each of the disks having an inner circumference, an outer circumference and a magnetic medium deposited between the inner circumference and the outer circumference, the disks defining a volume therebetween wherein airflow is generated when the disks rotate;

an actuator assembly; and an airflow spoiler positioned between the at least two disks, the airflow spoiler comprising:

a spoiler mounting portion configured to be mounted on the hub of the spindle motor assembly, and a non-data bearing extending portion connected to the spoiler mounting portion and extending outwardly therefrom into the volume defined between the disks, the non-data bearing extending portion extending at least partially over the magnetic medium, the non-data bearing extending portion comprising at least one elongate member extending outwardly from the spoiler mounting portion.

11. The disk drive of claim 10, wherein the non-data bearing extending portion comprises four elongate members that extend radially outwardly from the spoiler mounting portion, each of the elongate members having a generally oval transverse cross-section.

12. The disk drive of claim 11, wherein the spoiler mounting portion includes an outer perimeter, and the four elongate members are symmetrically positioned on the outer perimeter of the spoiler mounting portion.

13. The disk drive of claim 10, wherein at least one of the at least one elongate member has a generally triangular transverse cross-section.

14. The disk drive of claim 10, wherein at least one of the at least one elongate member has a generally symmetrical airfoil-shaped transverse cross-section.

15. The disk drive of claim 10, wherein at least one of the at least one elongate member has a transverse perimeter, the transverse perimeter varying from one end of the elongate member to the other.

16. The disk drive of claim 10, further comprising a generally planar structure interposed between the spoiler mounting portion and the at least one elongate member.

17. A disk drive comprising:

an enclosure;

a spindle motor assembly mounted on the enclosure, the spindle motor assembly including a hub that is rotatable with respect to the enclosure;

an actuator assembly comprising a first actuator arm with a first head-gimbal assembly mounted thereon and a second actuator arm with a second head-gimbal assembly mounted thereon;

a first disk mounted on the hub and a second disk mounted on the hub, the first disk and the second disk defining a volume therebetween wherein airflow is generated when the first disk and the second disk rotate; and an airflow spoiler positioned between the first disk and the second disk, the airflow spoiler comprising:

a spoiler mounting portion configured to be mounted on the hub of the spindle motor assembly; and an extending portion extending outwardly from the spoiler mounting portion into the volume defined between the first disk and the second disk, the extending portion positioned on the spoiler mounting portion so as to create a first clearance between the extending portion and the first disk and to create a second clearance between the extending portion and the second disk, the first clearance being large enough to receive a portion of the first head-gimbal assembly when the actuator assembly moves the portion of the first head-gimbal assembly into the first clearance, the second clearance being large enough to receive a portion of the second head-gimbal assembly when the actuator assembly moves the portion of second head-gimbal assembly into the second clearance.

18. An airflow spoiler for a disk drive having an enclosure, a spindle motor assembly mounted on the enclosure, the spindle motor assembly including a hub, and at least two disks mounted on the hub, each of the disks having an inner circumference, an outer circumference, and a magnetic medium deposited between the inner circumference and the outer circumference, the disks defining a volume therebetween wherein airflow is generated when the disks rotate, the airflow spoiler comprising:

a spoiler mounting portion configured to be mounted on the hub of the spindle motor assembly; and a non-data bearing extending portion connected to the spoiler mounting portion and extending outwardly therefrom into the volume defined between the disks, wherein the non-data bearing extending portion is configured to extend at least partially over the magnetic medium when the airflow spoiler is positioned in the disk drive.

19. The airflow spoiler of claim 18, wherein the non-data bearing extending portion comprises a generally planar structure mounted generally parallel to the disks.

20. The airflow spoiler of claim 19, wherein the non-data bearing extending portion comprises a ring.

21. The airflow spoiler of claim 20, wherein the non-data bearing extending portion extends at least about forty percent of a distance between the inner circumference of the disks and the outer circumference of the disks.

22. The airflow spoiler of claim 20 wherein the non-data bearing extending portion extends at least about fifty percent of a distance between the inner circumference of the disks and the outer circumference of the disks.

23. The airflow spoiler of claim 20, wherein the non-data bearing extending portion extends at least about sixty percent of a distance between the inner circumference of the disks and the outer circumference of the disks.

24. The airflow spoiler of claim 20, wherein the non-data bearing extending portion extends about fifty-five percent of a distance between the inner circumference of the disks and the outer circumference of the disks.

25. The airflow spoiler of claim 19, wherein the non-data bearing extending portion extends at least about forty percent of a distance between the inner circumference of the disks and the outer circumference of the disks.

26. The airflow spoiler of claim 19, wherein the non-data bearing extending portion is mounted about one-half of a distance between the two disks.

27. An airflow spoiler for a disk drive having an enclosure, a spindle motor assembly mounted on the enclosure, the spindle motor assembly including a hub, and at least two disks mounted on the hub, each of the disks having an inner circumference, an outer circumference, and a magnetic medium deposited between the inner circumference and the outer circumference, the disks defining a volume therebetween wherein airflow is generated when the disks rotate, the airflow spoiler comprising:

a spoiler mounting portion configured to be mounted on the hub of the spindle motor assembly; and a non-data bearing extending portion connected to the spoiler mounting portion and extending outwardly therefrom into the volume defined between the disks, wherein the non-data bearing extending portion is configured to extend at least partially over the magnetic medium when the airflow spoiler is positioned in the disk drive, and the non-data bearing extending portion comprising at least one elongate member extending outwardly from the spoiler mounting portion.

28. The airflow spoiler of claim 27, wherein the non-data bearing extending portion comprises four elongate members that extend radially outwardly from the spoiler mounting portion, each of the elongate members having a generally oval transverse cross-section.

29. The airflow spoiler of claim 28, wherein the spoiler mounting portion includes an outer perimeter, and the four elongate members are symmetrically positioned on the outer perimeter of the spoiler mounting portion.

30. The airflow spoiler of claim 27, wherein at least one of the at least one elongate member has a generally triangular transverse cross-section.

31. The airflow spoiler of claim 27, wherein at least one of the at least one elongate members has a generally symmetrical airfoil-shaped transverse cross-section.

32. The airflow spoiler of claim 27, wherein at least one of the at least one elongate member has a transverse perimeter, the transverse perimeter varying from one end of the elongate member to the other.

33. The airflow spoiler of claim 27, further comprising a generally planar structure interposed between the spoiler mounting portion and the at least one elongate member.

34. An airflow spoiler for a disk drive having an enclosure, a spindle motor assembly mounted on the enclosure, the spindle motor assembly including a hub, a first disk mounted on the hub, a second disk mounted on the hub, the first disk and the second disk defining a volume therebetween wherein airflow is generated when the first disk and the second disk rotate, and an actuator assembly comprising a first actuator arm having a first head-gimbal assembly mounted thereon, and a second actuator arm having a second head-gimbal assembly mounted thereon, the airflow spoiler comprising:

a spoiler mounting portion configured to be mounted on the hub of the spindle motor assembly; and an extending portion extending outwardly from the spoiler mounting portion into the volume defined between the first disk and the second disk;

wherein the extending portion is positioned on the spoiler mounting portion so that when the airflow spoiler is positioned in the disk drive, a first clearance is created between the extending portion and the first disk, and a second clearance is created between the extending portion and the second disk, the first clearance being large enough to receive a portion of the first head-gimbal assembly when the actuator assembly moves the portion of the first head-gimbal assembly into the first clearance, the second clearance being large enough to receive a portion of the second head-gimbal assembly when the actuator assembly moves the portion of the second head-gimbal assembly into the second clearance.

* * * * *